United States Patent [19]

Miyoshi et al.

[11] 4,043,372
[45] Aug. 23, 1977

[54] PNEUMATIC TIRE FOR OFF-ROAD VEHICLES

[75] Inventors: Isao Miyoshi, Kodaira; Masaru Abe, Sayama; Toshiro Tezuka, Higashi-Murayama; Toshio Yoshimoto, Akigawa, all of Japan

[73] Assignee: Bridgestone Tire Company Limited, Tokyo, Japan

[21] Appl. No.: 664,227

[22] Filed: Mar. 5, 1976

[30] Foreign Application Priority Data

Mar. 15, 1975   Japan ................................. 50-31579

[51] Int. Cl.² .......................... B60C 9/10; B60C 9/18
[52] U.S. Cl. ................................ 152/354; 152/361 R
[58] Field of Search ........... 152/354, 361 R, 361 DM, 152/357 R

[56] References Cited

U.S. PATENT DOCUMENTS

| | | | |
|---|---|---|---|
| 3,050,098 | 8/1962 | Grote | 152/354 |
| 3,442,315 | 5/1969 | Mirtain | 152/354 |
| 3,568,750 | 3/1971 | Henning | 152/354 |
| 3,703,203 | 11/1972 | Simpson | 152/354 |
| 3,982,580 | 9/1976 | Inoue et al. | 152/354 |

FOREIGN PATENT DOCUMENTS

| | | | |
|---|---|---|---|
| 815,139 | 6/1959 | United Kingdom | 152/354 |

*Primary Examiner*—Drayton E. Hoffman
*Attorney, Agent, or Firm*—Sughrue, Rothwell, Mion, Zinn and Macpeak

[57] ABSTRACT

A pneumatic tire for off-road vehicles, which is highly durable under heavy load conditions is disclosed. The tire makes use as its breaker of a reinforcing element formed of material having a high cut resistant property such as steel or glass. The least possible number of those plies of a plurality of rubberized ply layers of a carcass body which extend from a crown portion of the tire through both side portions up to both bead members and which can substantially withstand internal pressure applied to the tire and external force subjected thereto is determined on the basis of a fundamental safety factor $\xi$ and which lies within a range of a correction safety factor $\eta$ which depends on the use and type of the tire and the depth of tread groove.

5 Claims, 13 Drawing Figures

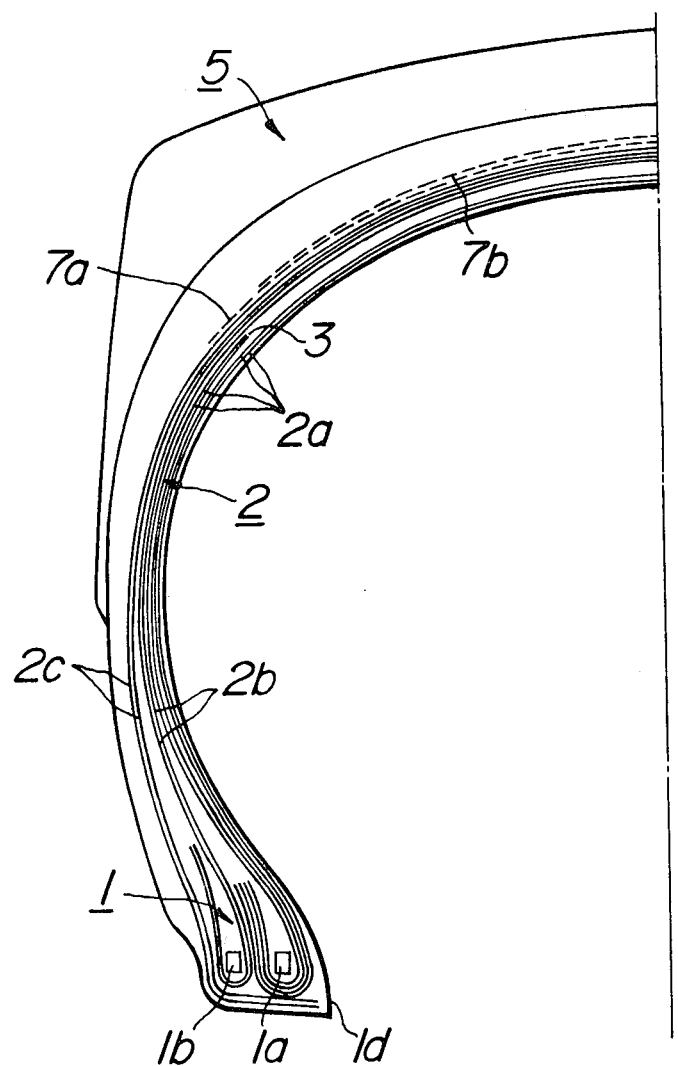

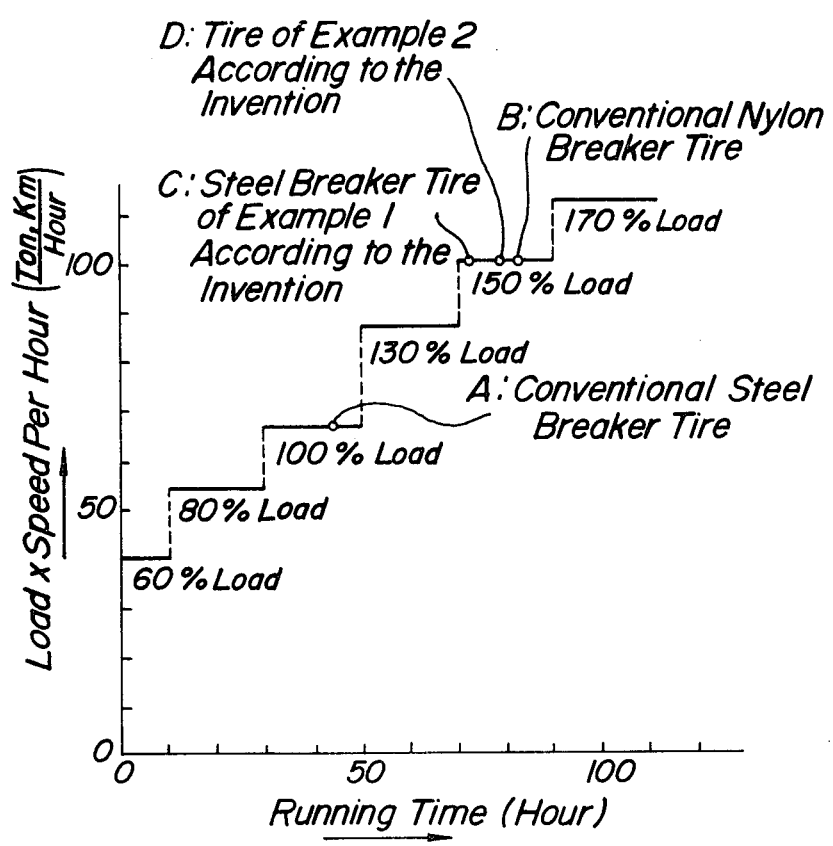

PNEUMATIC TIRE FOR OFF-ROAD VEHICLES

This invention relates to a pneumatic tire for off-road vehicles, which is highly durable under heavy load conditions.

The pneumatic tire for off-road vehicles is classified by JIS D6401 into the following two kinds of tires, i.e.
1. a tire for industrial vehicles, and
2. the first and third kinds of tires for construction vehicles.

More specifically, the pneumatic tire for off-road vehicles is classified into: (1) a tire for industrial vehicles such as a forklift truck, tractor for industrial vehicles; (2) various kinds of low speed trailers, straddle carrier, small type shovel loader and other relatively low speed trucks and (3) into a tire for construction vehicles such as scrapers for excavation, loading, carrying, scraping and other operations; a heavy dump truck, motor grades, tiredozer; tractor shovel; shovel loader, tire roller and the like. Additionally, a tire for construction vehicles is classified into the first kind of tires such as (1) a tire for motor trucks for carrying soil and used for travel on irregular ground such as sandy ground, muddy ground and the like inherent to the works of dam, aqueduct, road, residential land and the like; (2) a tire for motor trucks used for travel on hard and irregular grounds such as dam building yards, river improving yards, stone pits, mining yards and the like, (3) a tire for a lumber carrying vehicle used for travel on irregular ground where stubs are scattered as in a forest and the like and (4) tires for vehicles used under substantially the same conditions as mentioned above. Also, they are classified into the third kind of tires such as (1) a tire for a tractor shovel, shovel loader, low speed crane used for loading soil, sand and ore and excavation in plants, public works, harbor works and the like, (2) a tire for tiredozers and tires used under substantially the same conditions as mentioned above.

In a pneumatic tire for off-road vehicles, heretofore it has been the common practice to use a so-called nylon breaker tire comprising a carcass body composed of rubberized ply layers superimposed one upon the other and each containing relatively durable nylon cords embedded therein and assembled into a bias construction in which the cords of approximately one-half of the carcass ply layers are extended in an opposite direction to the cords associated with the remaining carcass ply layers with respect to the equatorial line of the tire, and a breaker superimposed about the crown portion of the carcass body and carcass body and composed of at least one rubberized layer each containing the relatively durable nylon cords embedded therein and assembled into the bias construction.

The above-mentioned nylon breaker tire, however, has disadvantages when the tire is used for travel on off-road where obstructions such as rocks, pieces of broken metal, glass and wood, stubs are scattered thereon, particularly under such condition that the load subjected to one tire is large, cut failure is liable to occur at the tread rubber surface, which often leads to fatal tire failure thus rendering the tire useless.

In order to prevent the tread rubber surface of the tire from being damaged by cuts, it has heretofore been proposed to use a so-called steel cord breaker tire in which the nylon cords of the breaker of the nylon breaker tire are replaced by steel cords.

Experimetanl tests have indicated that even though the steel cord breaker tire is superior in the cut resistant property of the tread rubber surface to nylon breaker tire, but has the following important disadvantages.

1. The tread rubber surface is subjected to a number of relatively small cuts which are not so fatal as to render the use of the tire impossible. These cuts, however, induce frequent occurrence of "cut abrasion" that causes the rubber layer to drop pieces.

2. 100% of the cut resistant property inherent to the steel cord per se could not always be utilized. That is, even though the cut resistant property of the steel cord breaker is superior to that of the nylon cord breaker, such excellent cut resistant property of the steel cord breaker is not sufficient to overcome difficulty in manufacture and high price of the steel breaker tire.

3. As well known in the art, nylon-to-rubber bonding techniques have been exceptionally well developed. On the contrary, sufficient acceptable steel-to-rubber bonding has not yet been attained by the conventional technique without disregarding the economy of the production of tire on the basis of commerce. Particularly, peeling resistance of the steel cord breaker tire subjected to fatigue and high temperature caused by repeated strain becomes insufficient, so that there is a risk of the tire becoming useless by separation failure caused by heat accumulated at the periphery of the steel breaker prior to obtention of the merit of the cut resistant property thereof.

When the pneumatic tire for off-road is subjected to heavy load, it is possible to use the tire for travel at such low speed that the tire failure due to heat accumulation is prevented. However, in practice since the tire is used for travel on irregular surfaces, it is difficult to maintain the internal pressure of the tire at a correct value and limit the speed of the vehicle to a value lower than a predetermined value. As a result, it is difficult to avoid occurrence of the above mentioned tire separation failure due to heat accumulation.

An object of the invention, therefore, is to provide a pneumatic tire for off-road vehicles, which can obviate all of the disadvantages which have been encountered with the above mentioned prior art techniques.

Another object of the invention is to provide a pneumatic tire for off-road vehicles, which is highly durable under heavy load conditions, has an excellent cut resistant property without cut abrasion and heat separation failure and can be used for a long time.

In accordance with the invention, a carcass body is composed of a plurality of rubberized ply layers superimposed one upn the other and each containing organic fiber cords embedded therein and assembled into a bias construction in which the cords of approximately one-half of the carcass ply layers are extended in an opposite direction to the cords associated with the remaining carcass ply layers with respect to the equatorial line of the tire in the same manner as in the case of the prior art technique in general.

It is most preferable to use an even number of rubberized ply layers in which the cords of each of the carcass ply layers are extended in an opposite direction to the cords associated with the adjacent carcass ply layers with respect to the equatorial line of the tire. In this case, the cords of each of the carcass ply layers may be locally extended in the same direction as the cords associated with the adjacent carcass ply layers with respect to the equatorial line of the tire. The number of those carcass ply layers which contain the cords extended in directions opposite with each other may be different from each other.

In addition, in accordance with the invention substantially total ply layers are extended from the crown portion of the tire through the side portion up to the bead member where at least one portion of the total ply layers are wound about the bead cores.

Those ply layers which are skipped at the crown portion of the tire play a role of protecting the cut failure at the side portion of the tire.

In accordance with the invention, a breaker is superimposed about the crown portion of the carcass body and composed of at least one rubberized layer each containing reinforcing elements embedded therein.

If the breaker makes use of a reinforcing element formed of material having an excellent cut resistant property, i.e. a high tensile strength having a high modulus of elasticity such as a steel cord, the difference between the modulus of elasticity of the breaker whose reinforcing elements are formed of the steel cord and the modulus of elasticity of the tread rubber and the carcass ply whose cords are formed of organic fiber such as nylon and the like becomes considerably large if compared with the case in which the breaker uses reinforcing elements formed of organic fiber such as nylon and the like. As a result, the separation tire failure is liable to occur. This is, because of the fact that if the tire makes contact with ground, a considerably large deformation occurs in that part of the tire which makes contact with ground and in adjacent part thereof. In this case, the difference between the modulus of elasticity of the breaker cord on the one hand and the modulus of elasticity of the rubber surrounding the breaker cord and carcass cord on the other hand results in a large relative displacement or relative strain. Such relative displacement or relative strain is gradually added with each other from the crown center portion of the tire toward the shoulder portion thereof and becomes maximum at the breaker end. This maximum relative displacement at the breaker end is called a "pecking out phenomenon" which is inherent to the breaker whick makes use of the reinforcing element having a high modulus of elasticity such as a steel cord. Such large relative displacement induces separation failure of the tire caused by mechanical fatigue.

In order to alleviate the relative displacement and hence prevent occurrence of the separation failure, the thickness of the rubber layer for surrounding the reinforcing element formed of steel cords of the breaker, which is called a cushion layer, is required to be far greater than the thickness of the reinforcing element formed of organic fiber such as nylon and the like. In addition, it is necessary to cover the breaker end with a special rubber layer.

As a result, the total thickness inclusive of the thickness of the tread rubber layer, the thickness of the breaker layer and the thickness of the carcass ply layer of the steel breaker tire becomes far greater than the total thickness of all of the above mentioned layers of the nylon breaker tire.

The great total thickness of all of the above mentioned layers of the steel breaker tire significantly prevents heat radiation effect thereof which can transfer the heat generated in the tire due to the hysteresis loss during rotation of the tire under load to the outside of tire, thereby accumulating heat in the tire. Heat accumulation leads to a temperature rise in the tire. This temperature rise in the tire accelerates heat fatigue which induces heat separation failure of the tire.

Particularly, if the breaker makes use of a steel cord as its reinforcing element, a lower limit of temperature for maintaining steel cord-to-rubber bonding by the conventional technique which does not disregard economy of the production of tire on the basis of commerce becomes considerably lower than the lower limit of temperature for maintaining organic fiber cord-to-rubber bonding by the same conventional technique. As a result, heat separation failure is liable to frequently occur. The heat separation failure in the steel breaker tire occurs at a time which is earlier than the time at which the heat separation occurs in the nylon breaker tire when both tires are used for travel at the same speed under the same load.

If the breaker makes use of a reinforcing element formed of material having a high cut resistant property, which is represented by a steel wire, that is, material having a tensile strength of at least 140 Kg/mm$^2$, preferably at least 170 Kg/mm$^2$ and at least 200 Kg/mm$^2$ when a maximum cut resistant property is required, such high modulus of elasticity together with the above mentioned great total thicknes required for preventing the separation failure due to the mechanical fatigue make the modulus of elasticity and bending rigidity of the tire as a whole considerably large, and as a result, so-called enveloping power for enveloping rocks and the like when the tire rides on the rocks and the like is reduced. This reduction of the enveloping power serves to increase pressure subject to the tread surface of the tire when the tire rides on the rocks and the like, so that the tread surface is liable to be worn by abrasion and hence so-called cut abrasion (which causes rubber to be scraped off by cuts) is accelerated to degrade the wear resistant property of the tire, thereby shortening life of the tire due to wear.

In addition, the above mentioned decrease of the enveloping power corresponds to decrease of faculty of absorbing external energy of the tire as a whole, the external energy being subjected to the tire from the road surface. It is a matter of course that such decrease of the faculty of absorbing the external energy of the tire as a whole results in an increase of energy and local concentration thereof required for the tread layer, breaker layer and carcass layer for the purpose of withstanding the external force subjected to the tire.

As a result, the breaker having a high modulus of elasticity is obliged to withstand the above mentioned increased energy that tends to induce premature failure. This, too, results in an insufficient display of the merit of the higher cut resistance property of the breaker and induces premature separation failure from that part of the breaker which has been subjected to the premature cut failure, thereby degrading the overall durability of the tire.

In order to improve the above mentioned disadvantage of the prior art breaker tire having a high cut resistant property, it is necessary to prevent the temperature rise in the tire and refrain the enveloping power from being decreased.

For this purpose, the total thickness of the crown portion of the tire is required to be decreased. The prior art bonding techniques which have been effected without disregarding the economy of the production of tire on the basis of commerce involve necessity of a sufficiently great thickness of the cushion rubber layer for the purpose of preventing the separation failure due to the mechanical fatigue. As a result, the thickness of the tread rubber layer is obliged to be decreased. The decrease of the thickness of the tread rubber layer results in a shortage of the wear life of the tire which is an important subsidiary to the cut resistant property of the tire and hence such shortage of the wear life of the tire could not be permitted.

Experimental tests have indicated that the use of at least one breaker layer composed of a reinforcing element having a high cut resistant property and superimposed about a carcass body of a bias construction ensures no provision of means for increasing the cut resistant property of the breaker by the carcass itself, which has been required in the case of the prior art nylon breaker tire, and that the carcass body is only required to have faculty of withstanding both the internal pressure applied to the tire and the external force struck against the tire. The invention, therefore, is based on such recognitions that the above mentioned prior art problems arising from the prior art bonding techniques can be eliminated by decreasing the number of plies of the carcass body to the least possible extent. In accordance with the invention, the number of plies of the carcass body is defined on the basis of the above recognitions as follows.

That is, in accordance with the invention, in a pneumatic tire for off-road vehicles, which makes use as its breaker of a reinforcing element formed of material having a high cut resistant property such as steel or glass, the least possible number of those plies of a plurality of ply layers of a carcass body which are extended from a crown portion of the tire through both side portions up to both bead members and which can substantially withstand internal pressure applied to the tire and external force subjected thereto is determined on the basis of a fundamental safety factor $\xi$ given by $$\xi = \frac{2T_C \cdot R_M \sum_{i=1}^{n} (\sin^2\alpha_n \cdot Nn)}{5P(R_M^2 - R_V^2)} = 6 \text{ to } 8$$

and which lies within a range of a correction safety factor $\eta$ which depends on the use and type of the tire and the depth of tread groove and which is given by $$\eta = K_1 \cdot K_2 \cdot K_3 \cdot \xi$$

where
 $T_C$ is a tensile strength of a cord (Kg/1 cord),
 P is a standard internal pressure defined by JIS D6401 or an internal pressure recommended by TRA YEAR BOOK published in U.S.A. for tires with sizes not defined by JIS (Kg/cm²),
 Nn is number of cords per 5 cm of each ply (Number of cords/5 cm),
 $\alpha_n$ is an angle of cords in each ply inclined with respect to the equatorial line of the tire (°),
 $R_M$ is a distance from the rotational axis of the tire to the innermost ply of the carcass body at the crown portion of the tire (cm),
 $R_V$ is $(R_M + R_R)/2$ where $R_R$ is a radius of a rim (if a rim diameter in inch is odd number, (the rim diameter $-$ 1) $\times$ 2.54 = $2R_R$) (cm),
 n is number of the carcass plies which can withstand the internal pressure applied to the tire and the external force subjected thereto,
 $K_1$ is a coefficient having a value in dependence with the use of the tire:
  The 1st kind of tire for construction vehicles defined by DIS 6401: 1.6
  The 3rd kind of tire for construction vehicles defined by DIS 6401: 1.0
  Tire for industrial vehicles defined by DIS 6401: 1.0
 $K_2$ is a coefficient having a value in dependence with the type of tire:
  Ordinary tire: 1.0
  An aspect ration H/S=0.87 to 1.0 for regular tread, Wide base tire: 1.1
  An aspect ratio H/S<0.87 for regular tread, and
 $K_3$ is a coefficient having a value in dependence with the depth of treat groove:
  Regular tread: 1
  Extra tread: 1.1
  Extra deep tread: 1.1,
 $K_2$ and $K_3$ being always 1 for the tire for industrial vehicles.

The pneumatic tire for off-road vehicles comprising the above mentioned carcass plies whose least possible number is determined on the basis of the fundamental safety factor $\xi$ and lies within the range of the correction safety factor $\eta$ is capable of collectively making the rigidity, thickness, mechanical strength of the carcass optimum, and of significantly improving the cut resistant property of the tire. These improvements are accomplished without deteriorating the wear resistant property, heat separation resistant property and cut abrasion resistant property, of the tire the essential characteristics required for the pneumatic tire for off-road vehicles are therefore improved to a level which is necessary and sufficient for the pneumatic tire for off-road vehicles.

The above mentioned correction safety factors $\eta$ for determining those least possible number of carcass plies which can withstand the internal pressure applied to the tire according to the invention and the external force subjected thereto are compared with those of the conventional tires in the following Table 1 with respect to various kinds of tires.

Table 1

| Kind | Use | Type Note 3 | Class dependent on depth of tread groove | Safety factor (n) of carcass Notes 4, 5 Tire according to the invention Note 1 | Conventional tire |
|---|---|---|---|---|---|
| | | Ordinary tire | Regular Note 2 (E1,E2,E3 / E5,E6,E7) | 11 (9.6 to 12.8) | 14.5 to 16.5 |
| | | | Extra (E4) | 12 (10.6 to 14.1) | 15.5 to 17.5 |
| The 1st kind | | Wide base tire | Regular (E1,E2,E3 / E5,E6) | 12 (10.6 to 14.1) | 15.5 to 17.5 |
| | | | Extra (E4) | 12.5 (11.6 to 15.5) | 16.5 to 18.5 |

Table 1-continued

| Kind | Use | Type Note 3 | Class dependent on depth of tread groove | Safety factor (n) of carcass Notes 4, 5 | |
|---|---|---|---|---|---|
| | | | | Tire according to the invention Note 1 | Conventional tire |
| Tire for construction vehicles | | Ordinary tire | Regular (L2,L3,L3S) | 7 (6 to 8) | 9 to 11 |
| | | | Extra (L4,L4S) Extra deep (L5,L5S) | 8 (6.6 to 8.8) | 10 to 12 |
| | The 3rd kind | Wide base tire | Regular (L2,L3,L3S) | 8 (6.6 to 8.8) | 10 to 12 |
| | | | Extra (L4,L4S) Extra deep (L5,L5S) | 8.5 (7.3 to 9.7) | 11 to 13 |
| Tire for Industrial vehicles | | | | 7 (6 to 8) | 9 to 11 |

Note 1: The numerical values are optimum values defined by the kind, use, type and class dependent on depth of tread groove and the values in the parentheses are those in an allowable range as defined above.

Note 2: The code numbers in the parentheses are those defined by TRA YEAR BOOK published in U.S.A.

Note 3: The ordinary tire is different in type from the wide base tire as in the following Table.

|  | Ordinary tire | Wide base tire |
|---|---|---|
| W1/S1 | 0.66 to 0.74 | at least 0.77 |
| H/S1 | 0.90 to 1.00 | at most 0.87 |

In the above Table, W1 is a width of a rim, S1 is a width of tire cross section and H is a height of tire cross section.
The above mentioned H/S1 is of one for the regular tread.
The wide base tire includes a super wide base tire whose W1/S1 is on the order of 0.83 and H/S1 is on the order of 0.63
The wide base tire is used under conditions which are different from those of the ordinary tire and is also different in sectional shape from the ordinary tire, so that the safety factor $\eta$ obtained from the above mentioned calculation formula is required to be larger than that of the ordinary tire.

Note 4: In the case of deriving the safety factor by calculation, the following plies which withstand the internal pressure applied to the tire and the external force subjected to the tire are taken into consideration.
Plies extending from the crown portion of the tire through the side portion to the bead core about which are wound the plies.
Cap plies extending from the crown portion of the tire through the side portion to that part of the bead member which is located above thereof and not wound about the bead core and secured to the part above the bead member.

Note 5: In the case of deriving the safety factor by calculation, the following plies which do not withstand the internal pressure applied to the tire and the external force subjected to the tire are not taken into consideration.
Breaker (inclusive of prior art breaker and cut resistant breaker according to the invention).
Plies located in the crown portion or plies extending from the crown portion of the tire to the side portion thereof with ends located in a region not beyond the maximum width position of the tire.
Side reinforcing plies wound about the bead core with ends secured to the bead member and extending from the bead member through the side portion of the tire to the crown portion thereof and not arrived at the center of the crown portion of the tire.
Plies which serve as a cut resistant layer and superimposed about the breaker layer and located near the tread.

In general, the carcass body has the following three faculties, that is,

A: A faculty which can serve as a pressure vessel for maintaining a high pressure gas such as air and the like and which can withstand the load subjected to the tire, B: A faculty which serves as a shell for maintaining the above mentioned high pressure gas in a stable state even when the tire is subjected to the external force subjected thereto and which can reliably transmit the driving force and braking force to the tire and can refrain from the tread movement and has a rigidity necessary for maintaining the abrasion resistant property of the tire, and C: A faculty which can serve as an elastic body having flexibility which is necessary and sufficient for withstanding the external force subjected to the tire and which can sufficiently endure repeated strain due to the external force subjected to the tire.

The faculty A is capable of not only reliably maintaining static internal pressure applied to the tire but also of reliably maintaining the internal pressure applied to the tire even when the tire is subjected to various kinds of dynamic external forces during running on the road surface under load and even when the carcass becomes damaged by obstructions scattered on the road surface in the case that the tire rides thereon and hence is subjected to the dynamic external force.

All of these three faculties are indispensable to the carcass body, of which the faculty A is of the most basic one. In order to satisfy this faculty A, the strength which withstands the internal pressure applied to the carcass is determined on the basis of a sufficiently large safety factor with the aid of the above mentioned calculation formulae. In addition, this safety factor is determined by taking the following two items into consideration.

a: Extent of external force subjected to the carcass and chiefly determined by the degree of roughness on the road surface on which the tire runs and by the running speed of the tire.

b: Extent of that cut failure of the carcass which is determined by the condition of the road surface on which the tire runs and by the load subjected to the carcass.

As a result, the strength of the carcass is given by strength against the internal pressure applied to the tire + surplus strength against the external force subjected to the carcass + surplus strength against cuts.

The safety factor $\eta$ of the conventional tire carcass will now be described. The safety factor of the conventional tire carcass for off-road vehicles represented by a pneumatic tire for construction vehicles is large and is 9 to 19. The pneumatic tires for off-road vehicles are divided into two kinds, that is, a tire for travel at a low speed such as a tire for loaders and a tire for travel at a high speed such as a tire for dumps or scrapers. The service conditions of the tire for travel at the low speed are very different from those of the tire for travel at the high speed, so that the severity subjected to the former tire is different from the severity subjected to the latter tire. As a result, the safety factor of the former tire is 9 to 13, while the safety factor of the latter tire is 14 to 19 which is larger than that of the former tire.

On the contrary, the safety factor of the carcass of a tire for vehicles, which is suited for travel on paved or substantially paved road, i.e. a passenger automobile, light truck, truck or bus is 8 to 9 which is smaller than that of the tire for construction vehicles.

The reasons why the safety factor of the carcass of the tire for off-road vehicles is considerably different from that of the tire for paved road vehicles are as follows.

When the nylon breaker tire travels on off-road, the tread surface portion of the tire is frequently subjected to cut failure due to obstructions such as sharp rocks, pieces of broken metal and glass, stubs, etc. and hence the tire becomes useless. The tire for off-road vehicles, therefore, is obliged to increase the number of the carcass plies and increase the total thickness of the carcass for the purpose of preventing the cut failure from reaching to the inner surface of the tire and hence of alleviating the tire failure. That is, surplus strength against cut failure must be made large. As a result, the safety factor of the carcass of the tire for off-road vehicles must be made significantly large if compared with that of the tire for paved road vehicles.

Recently, it has been the common practice to use steel instead of nylon as the breaker material for the purpose of increasing the cut resistant property of the nylon breaker tire for off-road vehicles. The use of steel is very effective for improving the cut resistant property of the tire. The carcass ply of the prior art steel breaker tire is the same in material as well as in number of plies as in the case of the nylon breaker tire. As a result, the safety factor of the carcass of the prior art steel breaker tire remains high as it was even though the cut resistant property of the tire as a whole has significantly been improved. The high safety factor of the carcass of the prior art steel breaker tire can itself lead to the disadvantage thereof.

This disadvantage can be alleviated by defining the least possible number of plies of the carcass body on the basis of the safety factor of the carcass by the above mentioned formulae according to the invention, thereby collectively optimizing the rigidity, thickness, strength, etc. of the carcass.

The use of the measures described ensures omission of "the surplus strength against the cut failure" from the constitutional elements of the tire for off-road vehicles and provides the important advantage that the presence of the breaker layer having an excellent cut resistant property causes the carcass to optimize the rigidity, thickness, strength, etc. thereof.

In carrying out the invention, the cut resistant breaker layers may be divided into a plurality of sections in their widthwise direction, respectively, the sections being spaced apart from each other. In addition, a rubberized layer containing organic fiber cords embedded therein may be superimposed about not only the rubberized breaker layer but also about the carcass ply for the purpose of improving the recap property of the tire. Alternatively, the rubberized layer containing the organic fiber cords embedded therein may be superimposed about each side edge of the rubberized breaker layer.

Experimental tests have indicated that the cut resistant property against obstructions such as rocks, pieces of broken metal and glass, etc. of the pneumatic tire according to the invention, which makes use of the reinforcing element having a high cut resistant property and in which some of the plies of the carcass body are skipped at their center portions or skipped along entire width thereof is far superior to the cut resistant property of the nylon breaker tire having a number of carcass plies. The use of the carcass plies in which some of the plies thereof are skipped at their crown center portions or skipped along entire width thereof ensures reduction of overall thickness of the tire inclusive of the thickness of the tread rubber extending from one of the shoulder portions to another shoulder portion, thickness of the breaker layer and thickness of the carcass ply layer. The reduction of the overall thickness of the tire can improve radiation of heat produced in the tire during its rotation, whereby occurrence of separation failure induced by excessive heat accumulation becomes less than that in the case of the nylon breaker tire.

Particularly, the center skipped construction of the carcass body according to the invention makes it possible to obtain the above mentioned advantageous effect but also reduce deflection of that portion of the tire in its widthwise direction which is located at a position immediately below the load subjected to the load, thereby alleviating cut failure of the side portion of the tire struck by sharp rocks. This is because of the fact that the thickness and hence the rigidity of the side portion of the tire according to the invention is the same as that of the prior art tire.

Some of the carcass plies may be skipped at their crown center portions or skipped along entire width thereof in dependence with the use and service conditions of the tire.

As stated hereinbefore, the invention is capable of applying the conventional high cut resistant breaker tire, which has been used under limited service conditions only due to the above mentioned various kinds of disadvantages thereof, to a pneumatic tire for off-road vehicles, which can be used for travel on various kinds of road surfaces, and is capable of considerably improving substantial safety factor of the tire as a whole even though the strength of the carcass body thereof is weaker than that of the nylon breaker tire.

In addition, the pneumatic tire for off-road vehicles according to the invention makes use of an optimum amount of material, so that it is possible to decrease the amount of material being used, thereby making the tire less expensive and hence contributing greatly to recent desires for conservation of energy and natural resources.

Moreover, the pneumatic tire for off-road vehicles according to the invention can decrease the number of carcass plies and hence the number of bead cores from double bead cores to a single bead core and from triple bead cores to double bead cores, thereby significantly increasing yield of tires.

The invention will now be described in greater detail with reference to the accompanying drawings, wherein:

FIG. 1 is a cross sectional view of a center skipped tire for off-road vehicle according to the invention;

FIG. 3 is a graph which illustrates the test result yielded from an acceleration test applied to the tire according to the invention compared with those of the conventional tires;

Figure 2B:
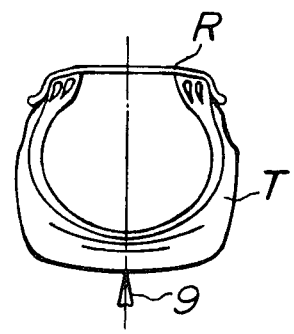
FIG. 2B is a cross sectional view of the tire to be tested mounted on a testing machine.

The invention will now be described with reference to examples of a pneumatic tire for off-road vehicles according to the invention.

EXAMPLE 1

In FIG. 1 is shown a cross section of one-half of a tire, parts being shown vertical center section through the rotational axis of the tire. The tire shown in FIG. 1 is of the 3rd kind of tire for construction vehicles (defined by JIS D6401), and belongs to a wide base tire having a regular tread and a size of 17.5-25 12PR, being indicated on the basis of a cotton yarn.

The tire shown in FIG. 1 comprises a bead member 1 composed of two sets of bead cores 1a, 1b and a carcass ply 2 composed of 8 plies each formed of a nylon cord of 1,260 denier/2 strands.

Four plies 2a of the total eight plies are wound about the bead core 1d from the inside toward the outside thereof and secured to the bead member 1. Two plies 3 of the four plies 2a which are located at the outside of a center part of the tire are skipped by a width which is substantially the same as the width of two breaker layers 7a, 7b each having an excellent cut resistant property. These two outside plies 3 serve as plies for reinforcing the side portion of the tire. As a result, the number of plies 2a at the crown tread portion of the tire becomes two, but the four plies 2a are extended from the hump portion of the tire to the bead core 1a are wound about the bead core 1a from the inside toward the outside thereof and secured to the bead member 1.

Two plies 2b are extended from the center portion of the tire to the bead member 1 and wound about the bead core 1b from the inside toward the outside thereof and secured to the bead member 1.

Finally, two outermost plies 2c are extended from the center portion of the tire to the bead member 1 where these two outermost plies 2c are extended from the outside along the lower surface of the bead cores 1b 1a toward the inside thereof and secured at their inner ends to a toe portion 1d of the bead member 1. The above mentioned construction may be called as a crown center skipped carcass ply.

The cords of these carcass plies are disposed in each of the plies and extended along two opposite directions symmetrically inclined at an angle of approximately 36° with respect to the equatorial line of the tire.

About these carcass plies 2 are superimposed two breaker layers 7a, 7b each composed of a rubberized fabric containing steel cords which constitute a reinforcing element. The width of these breaker layers 7a, 7b is approximately 90% of the tread width. Each of these breaker layers 7a, 7b is composed of a rubberized fabric containing stranded steel cords of $1 \times 4 \times 5 \times 4 \times 1$ (a filament diameter is 0.175 mm and a cord diameter is 1.26 mm). The number of the steel cords per 5 cm of the rubberized fabric is 18. These steel cords are disposed in each of the rubberized layers and extended along two opposite directions symmetrically inclined at an angle of approximately 36° with respect to the equatorial line of the tire.

The safety factor $\eta$ of the above mentioned carcass ply obtained by the above mentioned calculation formulae was 7.9. It is a matter of course that the above mentioned two plies 3 for reinforcing the side portion of the tire is not taken into the calculation.

On the contrary, the safety factor of the prior art carcass ply composed of 8 plies in total each formed of nylon cord of 1,260 denier/2 strands and extending from the crown center portion to the bead member was 11.1.

Figure 2A:
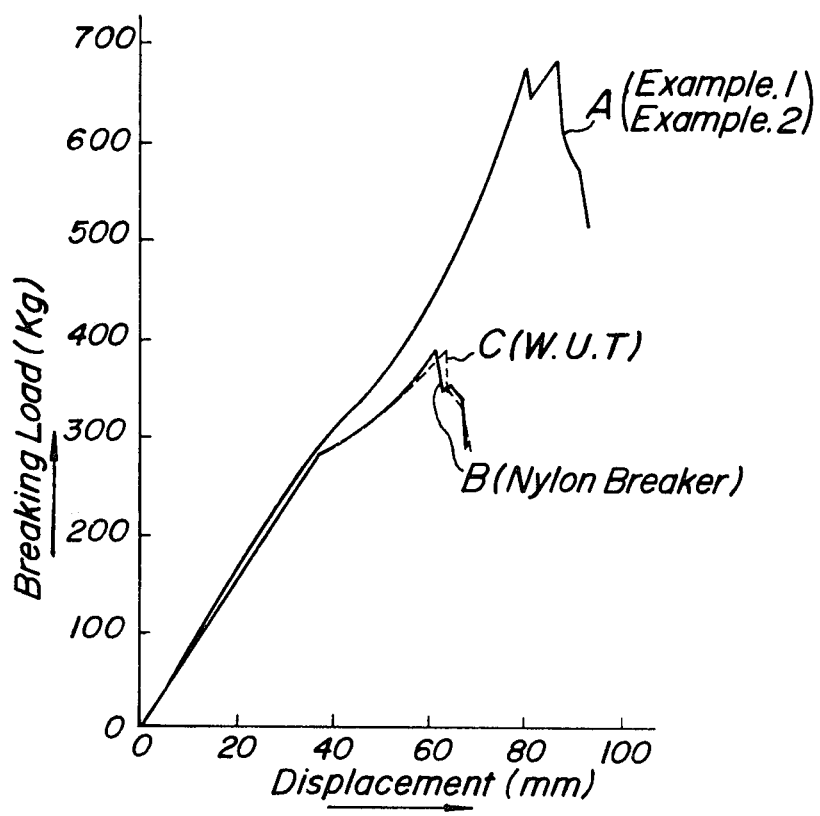
FIG. 2A is a graph which illustrates the cut resistant property of the tire according to the invention compared with those of the conventional tires.

In FIG. 2A is shown a graph which illustrates an improved cut resistant property of the tire built as above described manner compared with those of the prior art tires.

In order to obtain the experimental test results shown in FIG. 2A, a tire to be tested T shown in FIG. 2B is mounted on a standard rim R of 14.00×25 and pressurized to a standard internal pressure of 3.5 Kg/cm² as defined by JIS D6401 The tire T is mounted on Amsler's testing machine which makes use of a tapered sharp cutter 9 (FIG. 2B) whose taper angle is approximately 15°, blade width is 60 mm and blade length is 80 mm. The cutter 9 is formed of SKH3 and thrusted against the center of the tire to be tested T with a speed of 50 mm/min as shown in FIG. 2B. The cut resistant property of the tire to be tested T was observed with respect to a breaking load in Kg as a function of the amount of penetration of the cutter 8 into the tire T which will be described hereinafter as displacement of the cutter B.

In FIG. 2A, a curve A shows the test result of the tire according to the present example 1, a curve B shows the test result of a tire comprising a carcass ply 2a shown in FIG. 1, the 4 plies 2a of which are extended from the center portion of the tire to the bead core 1a and are wound about the bead core 11a from the inside toward the outside thereof and secured to the bead member 1 and two breaker layers each containing 34 stranded nylon cords per 5 cm, each stranded nylon cord being composed of 840 denier/2 strands, and the other structure being the same as that of the example 1, and a dotted lines curve C shows the test result of a WUT tire (Wire Under Tread tire) composed of a rubberized layer containing wires each having a diameter of 0.15 mm and a length of 12 mm, a weight ratio of the wires to rubber being 10%. This WUT layer having a thickness of 10 mm is inserted between the breaker layers and the tread rubber layer. The tread rubber layer becomes thin in thickness by the thickness of the WUT layer. The other structure of the WUT tire is the same as that of the tire shown by the curve B.

As seen from FIG. 2A, the breaking load indicating the cut resistant property of the tire of the example 1 according to the invention is two times stronger than those of the nylon breaker tire shown by the curve B and WUT tire shown by the dotted lines curve C.

In FIG. 3 is shown a test result of the separation resistant property of the tire of the example 1 according to the invention as compared with those of the conventional tires. In FIG. 3, load × speed per hour in Ton.Km/Hour is taken on ordinate and running time in hour is taken on abscissa.

The test is of an accelerated one effected by an indoor drum testing machine. The tire was pressurized to an internal pressure of 3.5 Kg/cm². The load was increased from 60% to 170% in a stepwise manner as shown in FIG. 3 with the speed made constant as 11 Km/hour. In this case, 100% load corresponds to 6,135 Kg on the basis of the standard load for 17.5-25 tire as defined by JIS D6401.

In FIG. 3, a point A shows a separation occurrence point in the conventional steel breaker tire, a point B shows a separation occurrence point in the conventional nylon breaker tire and C shows a separation failure occurrence point in the steel breaker tire of the example 1 according to the invention having the center skipped carcass ply.

As shown by the point A, the conventional steel breaker tire exceeded its limit temperature at the third step of 100% load, thus resulting in the breaker separation due to overheat. In contrast, as shown by the point C, the tire of the example 1 according to the invention safely passed through the 3rd step and arrived at the 5th step of 150% load where the breaker layer showed separation therein.

This separation resistant property of the tire of the example 1 according to the invention is substantially equal to that of the conventional nylon breaker tire shown by the point B.

As seen from the above, the tire of the example 1 according to the invention makes use of the steel breaker layers which are easily liable to separation occurrence therein, but has an excellent separation resistant property whic is comparable to that of the conventional nylon breaker tire.

2

Figure 4:
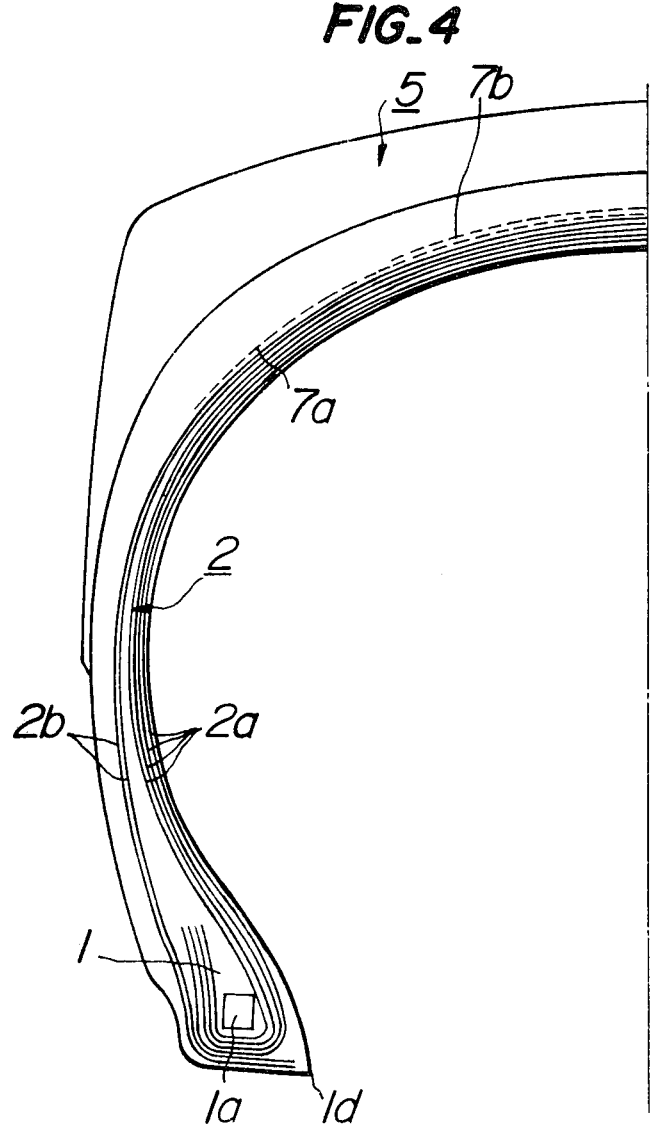
FIG. 4 is a cross sectional view of another embodiment of the tire according to the invention in which the number of carcass plies is decreased.

In FIG. 4 is shown a cross section of one-half of a tire, parts being shown vertical center section through the rotational axis of the tire. The tire shown in FIG. 4 is of the third kind of tire for construction vehicles (defined by JIS D6401) and belongs to a wide base tire having a regular tread and a size of 17.5-25 12PR. The thickness of the tread is the same as that of the tread of the example 1.

The tire shown in FIG. 4 comprises a bead member 1 composed of one bead core 1a and a carcass ply 2 composed of 6 plies each formed of a nylon cord of 1,260 denier/2 strands.

Four 2a of the total 6 plies are wound about the bead core 1a from the inside toward the outside thereof and secured to the bead member 1.

Two outermost plies 2b are extended from the center portion of the tire to the bead member 1 where these two outermost plies 2c are extended from the outside along the lower surface of the bead core 1a toward the inside thereof and secured at their inner ends to a toe portion 1d of the bead member 1.

The conventional nylon breaker tire comprises a carcass ply composed of 8 plies each formed of a nylon cord of 1,260 denier/2 strands.

However, the tire of the example 2 according to the invention comprises a carcass ply composed of 6 plies, so that it may be called as a total width skipped carcass ply.

The cords of these carcass plies are disposed in each of the plies and extended along two opposite directions symmetrically inclined at an angle of approximately 36° with respect to the equatorial line of the tire.

About these carcass plies 2 are superimposed two breaker layers 7a, 7b each composed of a rubberized fabric containing steel cords which constitute a reinforcing element. The width of the breaker layer 7a is 0.90 TW (TW is a tread width) and the width of the breaker layer 7b is 0.5 TW. Each of these breaker layers 7a, 7b is composed of a rubberized fabric containing stranded steel cords of 1×4×6×4×1 (a filament diameter is 0.175 mm and a cord diameter is 1.26 mm). The number of the steel cords per 5 cm of the rubberized fabric is 18. These steel cords are disposed in each of the rubberized layers and extended along two opposite directions symmetrically inclined at an angle of approximately 36° with respect to the equatorial line of the tire.

The safety factor of the carcass ply of the tire of the example 2 according to the invention, which was obtained by the above mentioned calculation formulae was 7.9.

On the contrary, the safety factor of the prior art carcass ply composed of 8 plies in total each formed of nylon cord of 1,260 denier/2 strands and extending from the crown portion to the bead member was 11.1.

In FIG. 2A, the curve A also shows the cut resistant property of the tire of the example 2 according to the invention which is two times stronger than those of the nylon breaker tire shown by the curve B and the WUT tire shown by the dotted lines curve C.

In FIG. 3, a point D shows a separation failure occurrence point in the steel breaker tire of the example 2 according to the invention having the total width skipped carcass ply.

EXAMPLE 3

In the tire of the example 2 according to the invention, each of the two breaker layers 7a, 7b superimposed about the carcass plies 2 shown in FIG. 4 is composed of a rubberized fabric containing a bundle of 14 helically formed steel filaments and constituting a reinforcing element. Each filament has a diameter of 0.25 mm and the bundle has a diameter of 1.17 mm. The number of bundles per 100 mm of the rubberized fabric is 36. The other construction is substantially the same as that of the example 2.

The diameter of the bundle becomes varied in accordance with the manner of assembling the steel filaments, so that is given by $$1.25 \times \sqrt{N} \times \text{filament diameter } \phi$$

where $n$ is the number of filaments per one bundle.

In the present example, the width of the breaker layer 7a is 0.90 TW and the width of the breaker layer 7b is 0.5 TW as shown in FIG. 4.

Figure 5:
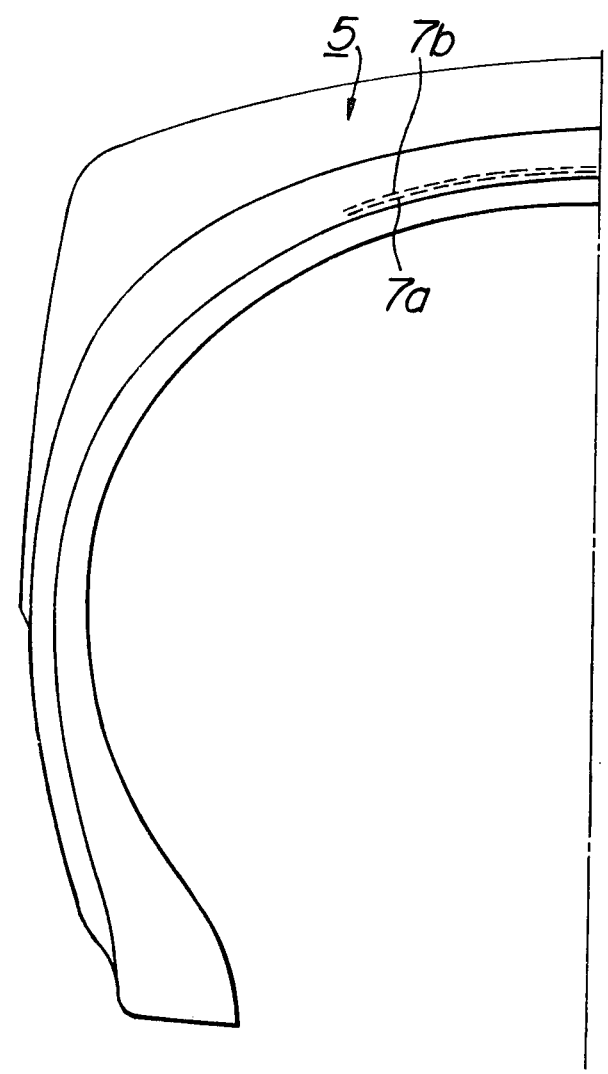
FIG. 5 is a cross sectional view of a further embodiment of the tire according to the invention which makes use of a modified arrangement of the breaker.

In FIG. 5 is shown another embodiment of the tire according to the invention in which the width of both the two breaker layers 7a, 7b is made 0.4 to 0.6 TW.

Experimental tests have demonstrated that both the tire of the present example 3 and the tire of another embodiment shown in FIG. 5 have an excellent cut resistant property and separation resistant property which are comparable to those of the tires of the examples 1 and 2 according to the invention.

EXAMPLE 4

Figure 6:
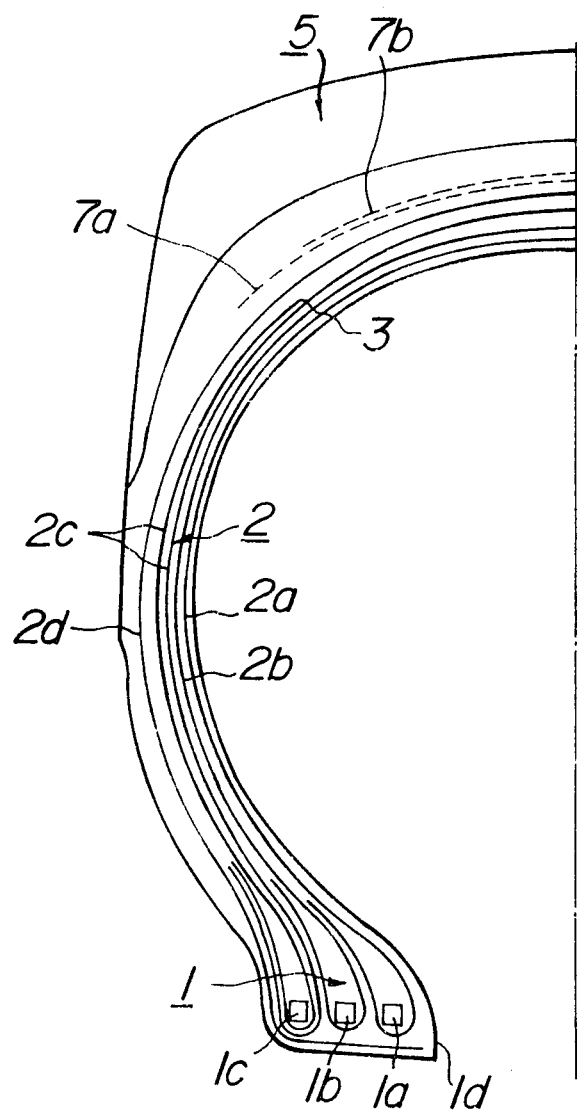
FIG. 6 is a cross-sectional view of a still further embodiment of the tire according to the invention.

In FIG. 6 is shown a cross section of one-half of the 1st kind of tire for construction vehicles (defined by DIS 6401) belonging to an ordinary tire having an extra tread, parts being shown vertical center section through the rotational axis of the tire. The tire shown in FIG. 6 has a size of 24.00-49 42PR, 42PR being indicated on the basis of a cotton yarn. The carcass ply is of a crown center skipped carcass ply as in the example 1 shown in FIG. 1.

The tire shown in FIG. 6 comprises a bead member 1 composed of 3 sets of bead cores 1a, 1b, 1c and a carcass ply 2 composed of 32 plies each formed of a nylon cord of 1,260 denier/2 strands.

Ten plies 2a are wound about the bead core 1a from the inside toward the outside thereof and secured to the bead member 1.

Ten plies 2b are wound about the bead core 1b from the inside toward the outside thereof and secured to the bead member 1.

Ten plies 2c are wound about the bead core 1c from the inside toward the outside thereof and secured to the bead member 1. Those eight plies 3 of the plies 2c which are located at the crown center portion of the tire are skipped by a width which is substantially the same as the width of two breaker layers 7a, 7b each having an excellent cut resistant property. As a result, the number of plies 2c at the crown portion of the tire becomes 2, but the 10 plies 2c are extended from the hump portion of the tire to the bead core 1c and are wound about the bead core 1c from the inside toward the outside thereof and secured to the bead member 1.

Finally, two outermost plies 2d are extended from the crown center portion of the tire to the bead member 1 where these 2 outermost plies 2c are extended from the outside along the lower surface of the bead cores 1c, 1c, 1a toward the inside thereof and secured at their inner ends to a toe portion 1d of the bead member 1.

The above mentioned construction is of a crown center skipped carcass ply, so that the thickness of the crown portion of the tire is thinner by approximately 10 mm than the thickness of the crown portion of a tire whose carcass ply is composed of 32 plies.

The cords of these carcass plies are disposed in each of the plies and extended along two opposite directions symmetrically inclined at an angle of approximately 35° with respect to the equatorial line of the tire.

About these carcass plies two are superimposed 2 breaker layers 7a, 7b each composed of a rubberized fabric containing steel cords which constitute a reinforcing element. The width of these breaker layers 7a, 7b is approximately 90% of the tread width. Each of these breaker layers 7a, 7b is composed of a rubberized fabric containing standed steel cords of $1 \times 4 + 6 \times 4 + 1$ (a filament diameter is 0.175 mm and a cord diameter is 1.26 mm). Eighteen steel cords per 5 cm of the rubberized fabric are used. These steel cords are disposed in each of the rubberized layers and extended along two opposite directions symmetrically inclined at an angle of approximately 36° with respect to the equatorial line of the tire.

The safety factor of the carcass ply of the tire of the example 4 according to the invention obtained by the above mentioned calculation formulae was 13.2. It is a matter of course that the above mentioned eight plies 3 for reinforcing the side portion only of the tire are not taken into the calculation of the safety factor.

On the contrary, the safety factor of the prior art carcass ply composed of 32 plies in total each formed of nylon cord of 1,260 denier/2 strands and extending from the crown center portion to the bead member was 16.9.

As seen from the above, the desired effect of the present invention can be realized.

EXAMPLE 5

Figure 7:
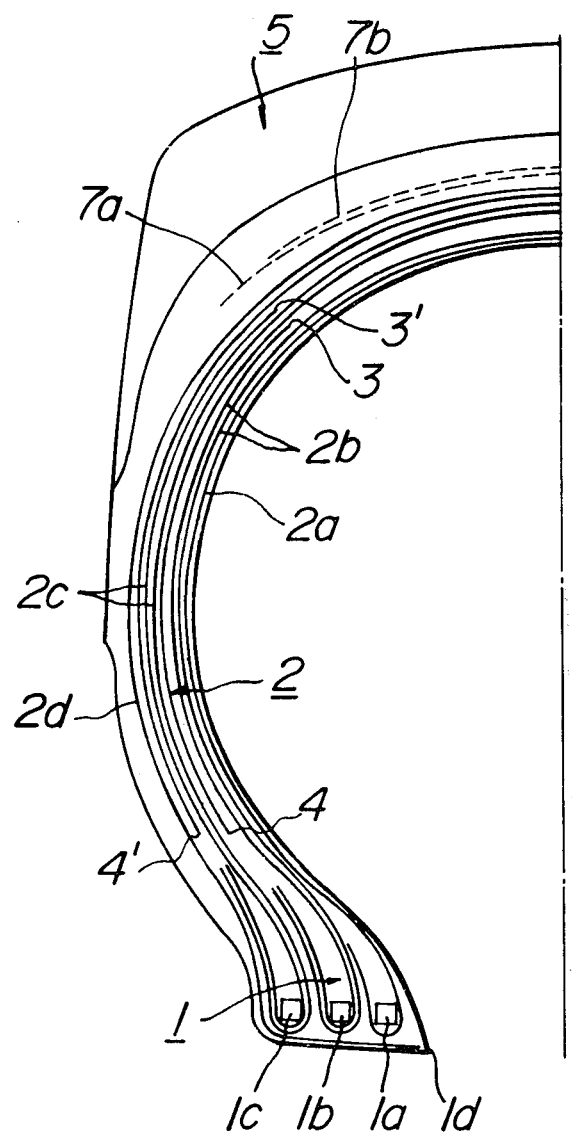
FIG. 7 is a cross sectional view of another embodiment of the tire according to the invention in which two plies are skipped at the center portion of the tire.

In FIG. 7 is shown a cross section of one-half of the 1st kind of tire for construction vehicles (defined by DIS 6401) belonging to an ordinary tire having an extra tread, parts being shown vertical center section through the rotational axis of the tire. The tire shown in FIG. 7 has a size of 24.00-49 42PR, 42 PR being indicated on the basis of a cotton yarn.

The tire shown in FIG. 7 comprises a bead member 1 composed of three sets of bead cores 1a, 1b, 1c and a carcass ply 2 composed of 32 plies each formed of a nylon cord of 1,260 denier/2 strands.

Ten plies 2a of the total 32 plies are wound about the bead core 1a from the inside toward the outside thereof and secured to the bead member 1.

Ten plies 2b are wound about the bead core 1b from the inside toward the outside thereof and secured to the bead member 1. Those four plies 3 of the plies 2b which are located outside thereof at a crown center portion of the tire are skipped by a width which is substantially the same as the width of two breaker layers 7a, 7b each having an excellent cut resistant property. As a result, the number of plies 2b at the crown center portion of the tire protected by the steel breakers 7a, 7b becomes 6, but the ten plies 2b are extended from the hump portion of the tire to the bead core 1b and are wound about the bead core 1b from the inside toward the outside thereof and secured to the bead member 1 to constitute a side reinforcing ply.

About this side reinforcing ply are superimposed four plies 4 which are extended from the crown center portion of the tire through the side portion thereof to a position located above the bead core 1b. These plies 4 may be designated a cap ply. As a result, the number of plies 2b at the crown center portion of the tire protected by the steel breakers 7a, 7b becomes 6, but the 10 plies 2b are extended from the hump portion of the tire to the bead core 1b and would about the bead core 1b from the inside toward the outside thereof and secured to the bead member 1.

Ten plies 2c are wound about the bead core 1c from the inside toward the outside thereof and secured to the bead member 1. Those four plies 3' of the plies 2c which are located outside thereof at the crown center portion of the tire are skipped in the same manner as in the case of the plies 2b.

As a result, the number of plies 2c at the crown center portion of the tire protected by the steel breakers 7a, 7b becomes 6, but the ten plies 2c are extended from the hump portion of the tire to the bead core 1c and are wound about the bead core 1c from the inside toward the outside thereof and secured to the bad member 1 to constitute a side reinforcing ply.

Finally, two outermost plies 2d are extended from the crown center portion of the tire to the bead member 1 where these two outermost plies 2d are extended from the outside along the lower surface of the bead cores 1c, 1b, 1a toward the inside thereof and secured at their inner ends to a toe portion 1d of the bead member 1.

The above mentioned combination of the crown center skipped carcass ply construction and the cap ply makes it possible to reduce the thickness of the crown center portion of the tire by approximately 10 mm if compared with the thickness of the crown center portion of a tire whose carcass ply is composed of 32 plies. The other construction is substantially the same as that of the example 4.

The safety factor of the carcass ply of the tire of the example 5 according to the invention obtained by the above mentioned calculation formulae was 13.2. It is a matter of course that the eight plies in total for reinforcing the side portion only of the tire are not taken into the calculation.

As seen from the above, the desired effect of the present invention can be realized.

Figure 8:
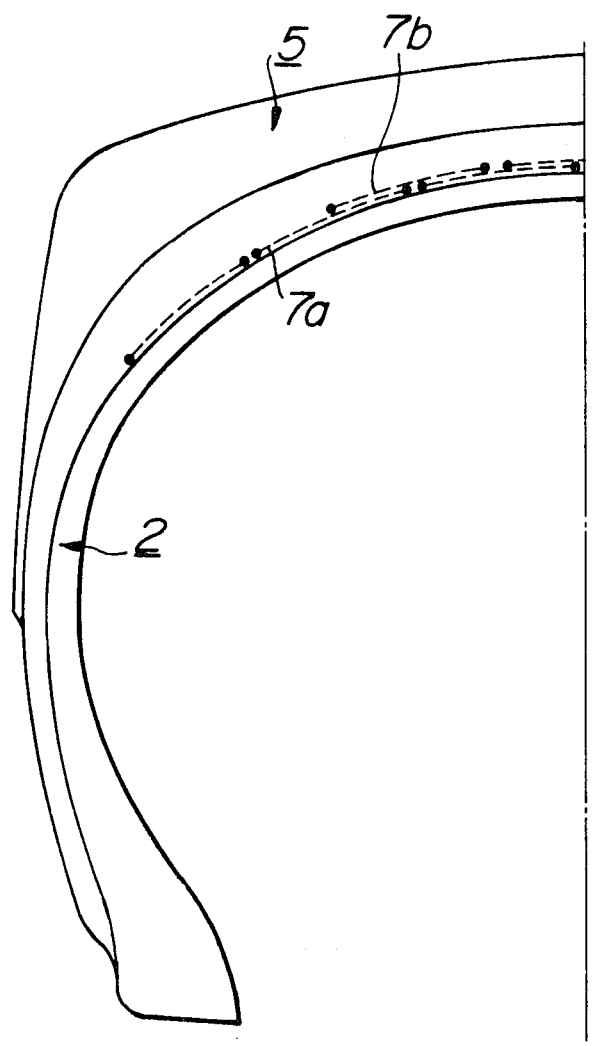
FIG. 8 is a cross sectional view of another embodiment of the tire according to the invention which shows a modified arrangement of the breaker.

In FIG. 8 is shown a modified embodiment of the tire according to the invention. In the present embodiment, the breaker layers 7a, 7b are divided into a plurality of sections in their widthwise direction, respectively, the sections being spaced apart from each other.

Figure 9:
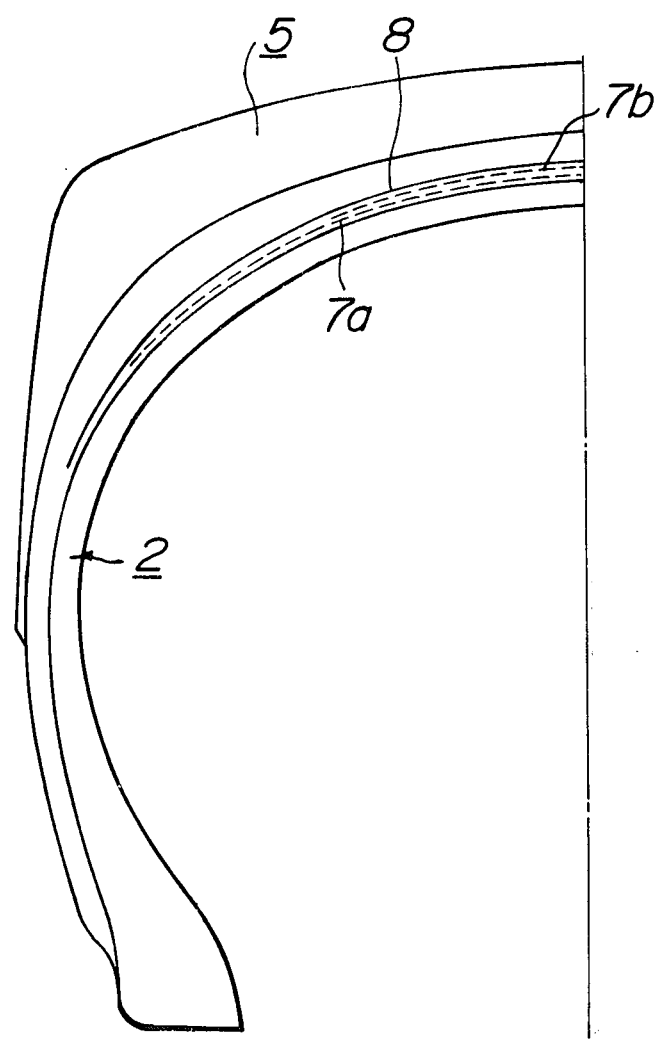
FIGS. 9 to 12 are sectional views of various modified embodiments of the tire according to the invention which make use of various forms of a breaker protective layer, respectively.

In FIG. 9 is shown another modified embodiment of the tire according to the invention. In the present embodiment, use is made of one protective layer 8 composed of a rubberized fabric containing organic fiber cords and superimposed about the breaker layers 7a, 7b.

Figure 10:
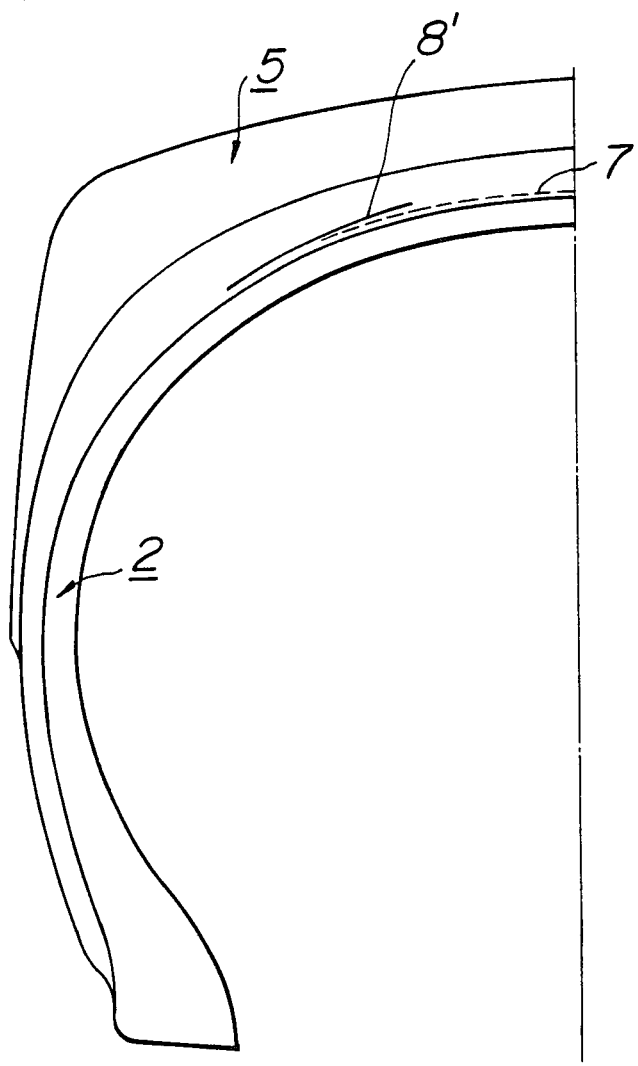

In FIG. 10 is shown a further modified embodiment of the tire according to the invention. In the present embodiment, a pair of protective layers 8', 8' are superimposed about side edges only of one breaker layer 7, respectively.

Those protective layers 8, 8' serves to improve recap property of the tire.

Figure 11:
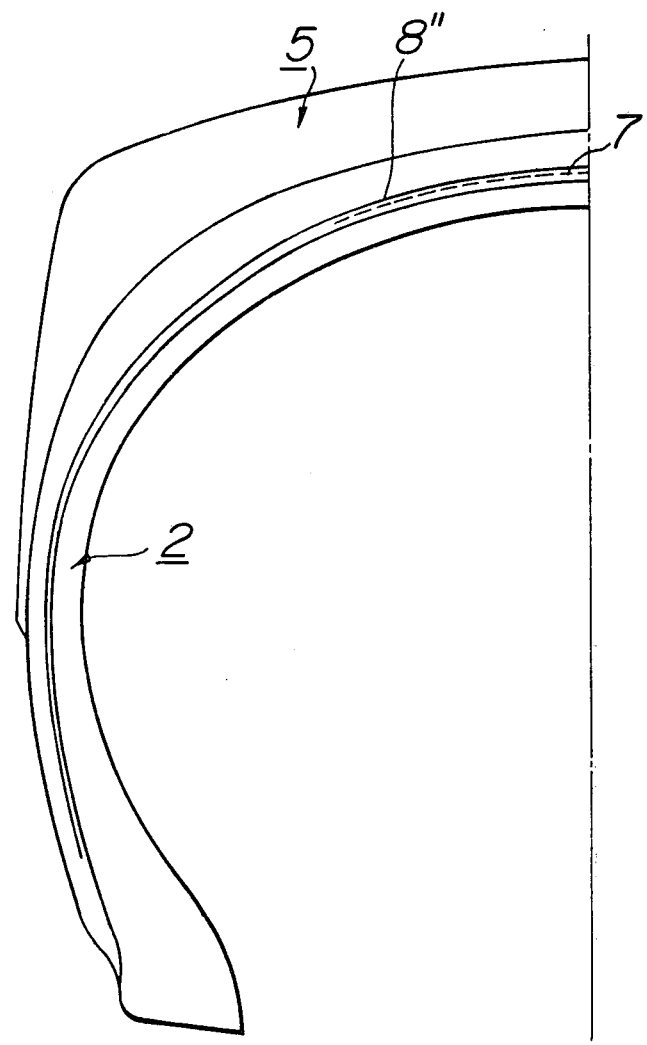

In FIG. 11 is shown a still further modified embodiment of the tire according to the invention. In the present embodiment, one protective layer 8'' is extended from the crown center portion of the tire through the side portions and arrives at a position located near the bead members.

Figure 12:
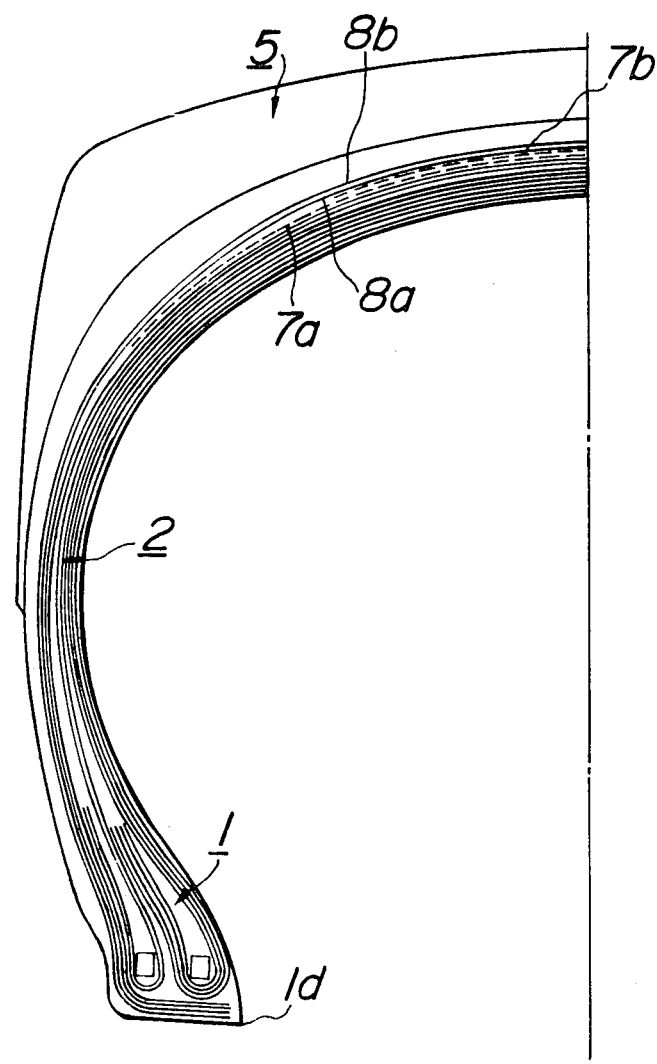

In FIG. 12 is shown another modified embodiment of the tire according to the invention. In the present embodiment, use is made of two additional protective layers 8a, 8b superimposed about the breaker layers 7a, 7b and composed of bias-laid carcass plies which constitute a part of the carcass plies and are extended from the crown center portion of the tire through the side portion and the lower surface of the bead member 1 up to the toe portion 1d thereof. It is a matter of course that the above mentioned protective layers 8, 8', 8'', 8a, 8b are not taken into the calculation of the safety factor.

What is claimed is:
1. A pneumatic tire for off-road vehicles, which is highly durable under heavy load conditions, comprising:
a carcass body composed of a plurality of rubberized ply layers superimposed one upon the other and each containing organic fiber cords embedded therein and assembled into a bias construction in which the organic fiber cords of substantially one-half of the carcass ply layers are extended in an opposite direction to the cords associated with the remaining carcass ply layers with respect to the equatorial line of the tire, a plurality of bead members, each having a bead core, at least one portion of the total ply layers extending from a crown portion of the tire through both side portions up to both bead members where at least one portion of the total ply layers are wound about bead cores, and
a breaker superimposed about the crown center portion of said carcass body and composed of at least one rubberized layer containing reinforcing elements embedded therein and formed of material having a tensile strength of at least 140 Kg/mm$^2$, the number of plies of said plurality of rubberized ply layers in said carcass body which extend from the crown portion of the tire through the side portions up to the bead members and which can substantially withstand internal pressure applied to the tire and external force subjected thereto determined on the basis of a fundamental safety factor $\xi$ wherein:

$$\xi = \frac{2T_C \cdot R_M \sum_{i=1}^{n} (\sin^2\alpha_n \cdot Nn)}{5P(R_M^2 - R_V^2)} = 6 \text{ to } 8$$

and which lies within a range of a correction safety factor $\eta$; $\eta$ governed by the use and type of the tire and the depth of tread groove and which is given by $$\eta = K_1 \cdot K_2 \cdot K_3 \cdot \xi$$

where
$T_C$ is a tensile strength of a cord (Kg/1 cord),
P is a standard internal pressure defined by JIS D6401 or an internal pressure recommended by TRA YEAR BOOK published in U.S.A. for tires with sizes not defined by JIS (Kg/cm²),
$N_n$ is number of cords per 5 cm of each ply (Number of cords/5 cm),
$\alpha_n$ is an angle of cords in each ply inclined with respect to the equatorial line of the tire (°),
$R_M$ is a distance from the rotational axis of the tire to the innermost ply of the carcass body at the crown portion of the tire (cm),
$R_V$ is $(R_M+R_R)/2$ where $R_R$ is a radius of a rim (if the rim diameter in inch is odd number, (the rim diameter $- 1) \times 2.54 = 2R_R$) (cm),
n is number of the carcass plies which can withstand the internal pressure applied to the tire and the external force subjected thereto,
$K_1$ is a coefficient having a value in dependence with the use of the tire:
The 1st kind of tire for construction vehicles defined by DIS 6401: 1.6
The 3rd kind of tire for construction vehicles defined by DIS 6401: 1.0
Tire for industrial vehicle defined by DIS 6401: 1.0
$K_2$ is a coefficient having a value in dependence with the type of tire:
Ordinary tire: 1.0
An aspect ratio H/S=0.87 to 1.0 for regular tread, Wide base tire: 1.1
An aspect ratio H/S<0.87 for regular tread, and
$K_3$ is a coefficient having a value in dependence with the depth of tread groove:
Regular tread: 1
Extra tread: 1.1
Extra deep tread: 1.1,
$K_2$ and $K_3$ being always 1 for tire for industrial vehicles.

2. A pneumatic tire for off-road vehicles as claimed in claim 1, wherein said safety factor $\eta$ is in the range of 6.6 to 8.8.

3. A pneumatic tire for off-road vehicles as claimed in claim 1, wherein said safety factor $\eta$ is in the range of 10.6 to 14.1.

4. A pnuematic tire as claimed in claim 1, wherein said factor is 7.9 for said 3rd kind wide base regular tread tire.

5. A pneumatic tire as claimed in claim 1, wherein said safety factor is 13.2 for said 1st kind ordinary extra tread tire.

* * * * *